(12) United States Patent
De Hoog

(10) Patent No.: US 7,265,932 B2
(45) Date of Patent: Sep. 4, 2007

(54) REPETITIVE CONTROLLER HAVING REDUCED MEMORY ELEMENTS

(75) Inventor: Thomas Jan De Hoog, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 12 days.

(21) Appl. No.: 10/538,628

(22) PCT Filed: Dec. 12, 2003

(86) PCT No.: PCT/IB03/05930

§ 371 (c)(1),
(2), (4) Date: Jun. 10, 2005

(87) PCT Pub. No.: WO2004/055606

PCT Pub. Date: Jul. 1, 2004

(65) Prior Publication Data

US 2006/0061903 A1   Mar. 23, 2006

(30) Foreign Application Priority Data

Dec. 18, 2002   (EP)   .................................. 02293137

(51) Int. Cl.
*G11B 5/596*   (2006.01)

(52) U.S. Cl. .................................................. 360/77.04
(58) Field of Classification Search ...................... None
See application file for complete search history.

(56) References Cited

U.S. PATENT DOCUMENTS

| | | | | |
|---|---|---|---|---|
| 4,569,072 A | * | 2/1986 | van Roermund | 371/7 |
| 5,404,418 A | * | 4/1995 | Nagano | 388/806 |
| 5,406,126 A | * | 4/1995 | Hadley et al. | 290/45 |
| 5,592,346 A | * | 1/1997 | Sullivan | 360/77.04 |
| 5,740,090 A | * | 4/1998 | Steinbuch et al. | 708/310 |
| 6,765,848 B2 | * | 7/2004 | Faucett | 369/44.32 |

* cited by examiner

*Primary Examiner*—K. Wong
(74) *Attorney, Agent, or Firm*—Michael E. Belk

(57) ABSTRACT

A repetitive controller for suppressing periodic signals with half-wave symmetry includes a memory loop fed with a periodic signal of period NT and in which the memory size includes N/2 memory elements. A negative feedback connection is provided and a factor of $-\frac{1}{2}$ is provided at the output of the memory loop. Such a repetitive controller may be used for instance in the disturbance compensation module of a drive servo system in a recording and reproducing apparatus including a head for recording data on a recording medium.

2 Claims, 2 Drawing Sheets

REPETITIVE CONTROLLER HAVING REDUCED MEMORY ELEMENTS

FIELD OF THE INVENTION

The present invention relates to a repetitive controller for suppressing periodic signals with half-wave symmetry (a periodic signal x(t) with a period T is said to have a half-wave symmetry if it holds that x(t+T/2)=−x(t), whatever t).

BACKGROUND OF THE INVENTION

Repetitive control, also known as iterative learning control, is a very effective control strategy in the numerous control applications where input reference signals or disturbances are periodic and their periods are known, for instance in control systems that suffer from periodic disturbances (e.g. optical or magnetic disc drives, or steel milling machines) or have to perform the same task repeatedly (robots, pick and place machines, . . . ). Such a strategy is illustrated in many documents and for example in "Repetitive control for systems with uncertain period-time", by M. Steinbuch, Automatica, In Press, Sep. 4, 2002, pp 1-7. The simplest implementation of a repetitive controller, illustrated in FIG. 1, basically comprises a FIFO (First-In-First-Out) memory buffer with N taps (i.e. N memory elements) captured inside a positive feedback loop where N times the sampling time $T_S$ is equal to the fundamental period of the periodic disturbance (in practice, a repetitive controller also contains a filter for stabilization, but it is not relevant for the invention that will be described).

Such a buffer inside a loop, also called memory loop, can be considered as an autonomous periodic signal generator. A drawback of using a memory loop as a signal generator is that, in some cases, it requires a large amount of memory. Depending on the sampling time $T_S$ and the signal period T, the number N of memory places can become large. Two types of solutions have then been proposed for replacing the memory loop with N memory elements by a periodic signal generator that requires less memory. The first one consists in applying a downsampling, i.e. using a larger sampling time, thereby reducing the number of required memory elements, but the main drawback of such a solution is that the control bandwidth is reduced. The second solution consists in applying a series or parallel connection of as many sinusoidal signal generators as necessary to deal with all the harmonic components present in the periodic signal, only two states or memory elements being required for each generator. The drawback of this approach is that the complexity of implementation is large when compared to the classical memory loop.

SUMMARY OF THE INVENTION

It is therefore an object of the invention to propose a much more simple implementation of repetitive controller.

To this end, the invention relates to a repetitive controller having the form of a memory loop fed with a periodic signal of period NT and in which the memory size includes N/2 memory elements, the feedback connection is negative and a factor of ½ is provided at the output of the memory loop.

This structure, which requires only half of the memory with respect to the previous solution, has however the same control bandwidth as said previous solution and is very simple to implement.

BRIEF DESCRIPTION OF THE DRAWINGS

The invention will now be described in a more detailed manner, with reference to the accompanying drawings in which:

FIG. 3 shows curves allowing to compare the responses of a classical memory loop and the proposed simplified memory loop to a pure sinusoid;

FIG. 7 shows, in the case of a mobile control problem, one period of a typical reference trajectory.

DETAILED DESCRIPTION OF THE INVENTION

Figure 2:
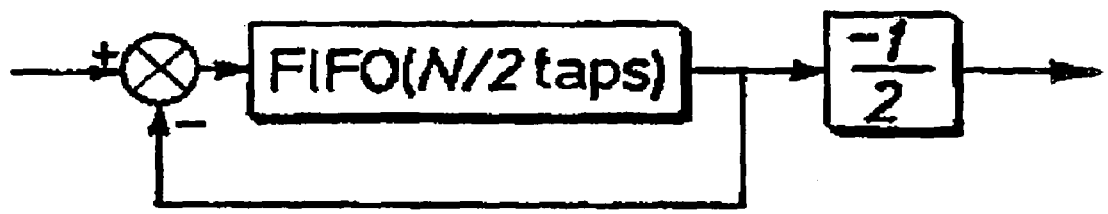
FIG. 2 shows an example of implementation of a repetitive controller according to the invention.

According to the invention, the classical memory loop is now replaced, as illustrated in FIG. 2, by a simplified memory loop, in which:

- the memory size is halved and includes only N/2 memory elements;
- the feedback is negative instead of positive;
- a factor (−½) is included at the output of the loop in order to adjust the gain and phase of the output signal, so that the proposed loop matches the gain and phase of a classical memory loop.

As shown in FIG. 3 giving (with respect to the time indicated in number of periods) the response of a classical memory loop to a pure sinusoid (dotted line) compared to that of the proposed simplified memory loop (solid line), it is clear that, when a sinusoid of period $NT_S$ is fed into this loop, the output of the device responds in a manner which is very similar to the output of the classical memory loop (it is obviously required that N is even, which is true in most practical cases).

The mathematical point of view can be useful to better understand the invention. The transfer function of a classical memory loop is equal to:

$$\frac{Z^{-N}}{1-Z^{-N}} \quad (1)$$

This transfer function (1) can be split up as follows:

$$\frac{Z^{-N}}{1-Z^{-N}} = \frac{1}{2}\frac{Z^{-N/2}}{1-Z^{-N/2}} - \frac{1}{2}\frac{Z^{-N/2}}{1+Z^{-N/2}} \quad (2)$$

Figure 1:
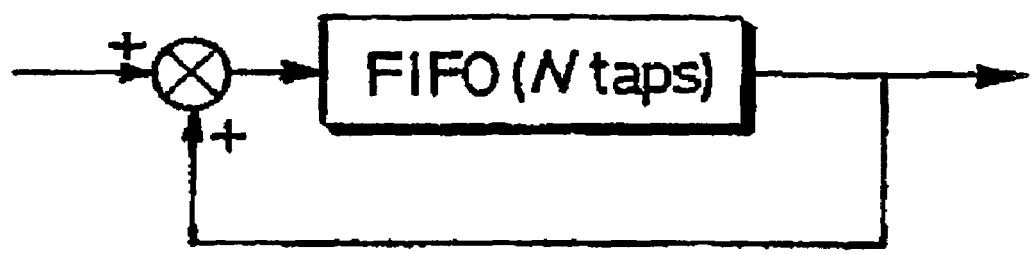
FIG. 1 shows a block diagram of a standard memory loop.
Figure 4:
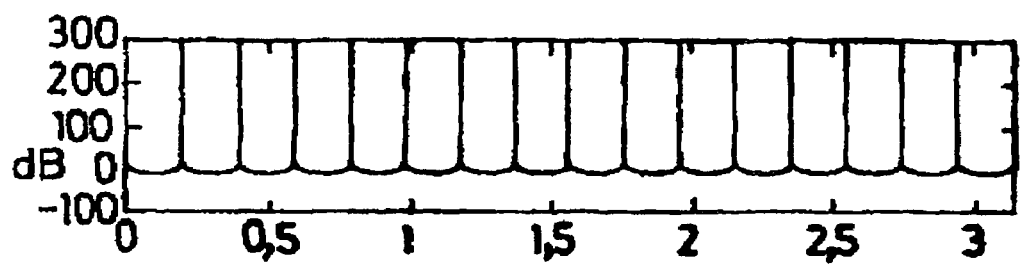
FIGS. 4 to 6 show amplitude plots, respectively for the classical memory loop (with N=32), for the new proposed memory loop, and for the complement of said new memory loop.
Figure 5:
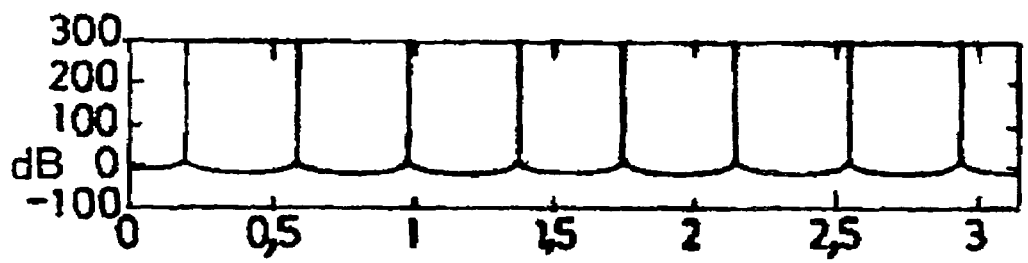
Figure 6:
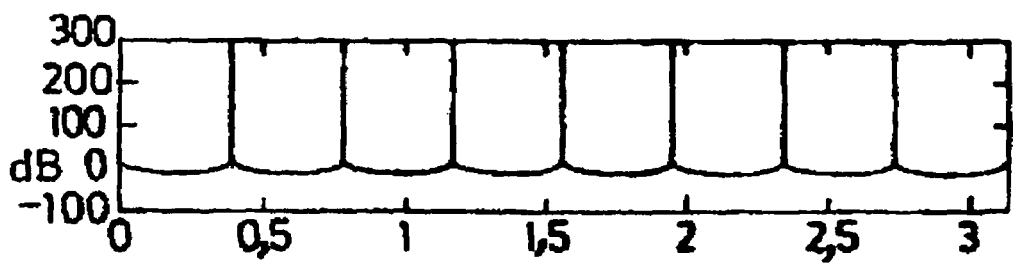

The right term of the right side of the expression (2) represents the new memory loop shown in FIG. 2, while the complementing left term represents an alternative embodiment of a repetitive controller that can be used to deal with periodic signals that completely lack half-wave symmetry. When looking at the amplitude plot of the right and left terms of the right side of the expression (2) (where FIG. 5 is a plot associated with the right term and FIG. 6 is a plot associated with the left term of the right side of the expression (2)), given in dB with respect to normalized frequencies expressed in radians, it is clear that the right term has infinite gain peaks at the odd harmonic frequencies, while the complement has infinite gain peaks at the even harmonic frequencies. FIG. 4 shows an amplitude plot for the classical memory loop (with N =32) shown in FIG. 1.

So, from a mathematical point of view, the proposed memory loop can be seen as one half part of a classical memory loop: the half that deals with the odd harmonics of the disturbance signal. This feature of splitting up the memory loop in a smaller one can be carried on further if N is a power of 2, the memory loop being then split up in smaller memory loops.

For example, the next stage in such a decomposition is as follows:

$$\frac{Z^{-N}}{1-Z^{-N}} = \frac{1}{2}\left(\frac{1}{2}\frac{Z^{-N/4}}{1-Z^{-N/4}} - \frac{1}{2}\frac{Z^{-N/4}}{1+Z^{-N/4}}\right) - \frac{1}{2}\frac{Z^{-N/2}}{1+Z^{-N/2}} \quad (3)$$

The classical memory loop can for instance be approximated by:

$$-\frac{1}{4}\frac{Z^{-N/4}}{1+Z^{-N/4}} - \frac{1}{2}\frac{Z^{-N/2}}{1+Z^{-N/2}} \quad (4)$$

or:

$$\frac{1}{4}\frac{Z^{-N/4}}{1-Z^{-N/4}} - \frac{1}{2}\frac{Z^{-N/2}}{1+Z^{-N/2}} \quad (5)$$

which both require memory loops with a total of 3N/4 memory elements, instead of the full N ones (the left approximation suppresses the odd harmonics plus the $2^{nd}$, $6^{th}$, $10^{th}$, . . . while the right approximation suppresses the odd harmonics plus the $0^{th}$, $4^{th}$, $8^{th}$, . . . ).

The structure according to the invention has however a limitation: it only suppresses periodic signals that have a half-wave symmetry (in other words, it only suppresses the odd harmonics of the periodic signal). This limitation is however not so large because in many applications the periodic signal to be suppressed has indeed a half-wave symmetry. For instance, in optic and magnetic disc storage, the dominant disturbance is a pure sinusoid that is caused by the eccentricity of the tracks of the recording medium and is perfectly rejected if the technical solution according to the invention is used. Also in the case of pick-and-place mechanisms, for example, the required task often has a half-wave symmetry.

Obviously, the memory loop according to the invention can be used as a repetitive controller in a recording and reproducing apparatus including a head for recording data on a recording medium or reproducing the recorded data from said recording medium and a drive servo system for said recording medium. Said system comprises, for compensating for the eccentricity of the recording medium, a disturbance compensation module using iterative learning control and itself comprising a repetitive controller in the form of a memory loop fed with a periodic signal of period NT. As said above, in this memory loop, the memory size includes N/2 memory elements, the feedback connection is negative and a factor of –½ is provided at the output of the memory loop.

It has been seen above that the proposed controller preferably works for periodic signals with half-wave symmetry. However, if the disturbance signal also contains a dominant component at an even harmonic frequency (e.g. the $2^{nd}$), said controller can be augmented with an appropriate sinusoidal signal generator, in order to deal with this particular frequency component. This adds only two states—or memory elements—to the controller, and the reduction of required memory with respect to a classical repetitive controller is still significant, especially if N is large.

Another important benefit of the proposed controller is that the control gain can be made twice as large as the gain of a classical repetitive controller, while keeping the same level of stability robustness. More precisely, the gain should be kept between 0 and 2 for the classical controller and between 0 and 4 for the new one, which means that the speed of convergence of the new controller can be doubled (without sacrificing robustness) compared to the classical one. In optical or magnetic disc recording, for instance, this means that the wait time before reading/recording can start can be in principle reduced, which enhances the performance of the drive.

In iterative learning control applications (such as pick-and-place machines or other motion control systems that have to carry out a task repeatedly, e.g. wafer stepping systems as used in integrated circuits manufacturing), this means also that the number of required learning cycles can be reduced. In those control problems, the reference signals almost always are half-wave symmetric, for the following reason. A motion in one direction is usually followed by an equal motion in the opposite direction, and these motions are very often each other's exact mirror image. Usually, some filtered bang-bang profile has to be followed, which obviously is half-wave symmetric, except for a DC or ramp component. This feature had never been exploited. The enclosed FIG. 7 shows, for mobile control problems, the desired position of a picture of one period of a typical reference trajectory profile, which is half-wave symmetric.

The invention claimed is:

1. A repetitive controller having the form of a memory loop fed with a periodic signal of period NT and in which the memory size of N/2 memory elements, the feedback connection is negative and a factor of –½ is provided at the output of the memory loop, wherein N is an integer and T is period of time.

2. In a recording and reproducing apparatus including a head for recording data on a recording medium or reproducing the recorded data from said recording medium, a drive servo system for said recording medium, said system comprising a disturbance compensation module for compensating for the eccentricity of the recording medium, said module using iterative learning control and itself comprising a repetitive controller in the form of a memory loop fed with a periodic signal of period NT and in which the memory size of N/2 memory elements, the feedback connection is negative and a factor of –½ is provided at the output of the memory loop, wherein N is an integer and T is period of time.

* * * * *